US011919072B2

(12) United States Patent
Lu et al.

(10) Patent No.: US 11,919,072 B2
(45) Date of Patent: Mar. 5, 2024

(54) PREPARATION PROCESS OF MULTI-COMPONENT SPHERICAL ALLOY POWDER

(71) Applicant: ZHENG ZHOU RESEARCH INSTITUTE OF MECHANICAL ENGINEERING CO., Ltd., Zhengzhou (CN)

(72) Inventors: Zhihui Lu, Zhengzhou (CN); Hongtao Yang, Zhengzhou (CN); Xudong Si, Zhengzhou (CN); Zhiyang Sun, Zhengzhou (CN); Leile Zhang, Zhengzhou (CN); Guangfei You, Zhengzhou (CN); Yiyong Wu, Zhengzhou (CN); Chao Chen, Zhengzhou (CN)

(73) Assignee: ZHENG ZHOU RESEARCH INSTITUTE OF MECHANICAL ENGINEERING, Zhengzhou (CN)

( * ) Notice: Subject to any disclaimer, the term of this patent is extended or adjusted under 35 U.S.C. 154(b) by 160 days.

(21) Appl. No.: 17/669,865

(22) Filed: Feb. 11, 2022

(65) Prior Publication Data
US 2023/0219133 A1    Jul. 13, 2023

Related U.S. Application Data

(63) Continuation of application No. PCT/CN2022/072870, filed on Jan. 20, 2022.

(30) Foreign Application Priority Data

Jan. 11, 2022 (CN) .......................... 202210027237.3

(51) Int. Cl.
*B22F 1/065* (2022.01)
*B22F 9/04* (2006.01)
(Continued)

(52) U.S. Cl.
CPC .............. *B22F 1/065* (2022.01); *B22F 1/145* (2022.01); *B22F 3/15* (2013.01); *B22F 9/04* (2013.01);
(Continued)

(58) Field of Classification Search
CPC .. B22F 1/065; B22F 1/145; B22F 3/15; B22F 9/04; B22F 2009/043; B22F 2201/11
See application file for complete search history.

(56) References Cited

U.S. PATENT DOCUMENTS 4,562,039 A * 12/1985 Koehler ................. B01D 39/12
427/244
2018/0236138 A1* 8/2018 Ye .......................... A61L 27/025

OTHER PUBLICATIONS

Yin et al. ("Titanium-tantalum alloy powder produced by the plasma rotating electrode process (PREP)." Key Engineering Materials 770 (2018): 18-22.) (Year: 2018).*

* cited by examiner

*Primary Examiner* — Ricardo D Morales

(57) ABSTRACT

The present invention discloses a preparation process of multi-component spherical alloy powder, which adopts a plasma rotation electrode process (PREP) method to prepare the multi-component spherical alloy powder. The multi-component alloy includes at least one of refractory metals and compounds thereof, specifically including tungsten, molybdenum, tantalum, niobium, rhenium, tungsten carbide, tantalum carbide and the like.

The present invention adopts the PREP method to prepare the multi-component spherical alloy powder containing the refractory metals or compound thereof, and the prepared multi-component spherical alloy powder has high sphericity, good fluidity and high tap density, and is low in content of impurity elements and output of hollow powder and satellite powder; compared with other preparation methods, the (Continued)

prepared alloy powder has better performance and is an ideal material for metal 3D printing; and the present invention further solves the problem of difficulty in preparing a round rod with the refractory metals or compound thereof as a base material used in the PREP method, and provides a spatial structure meshing method, a direct element mixing method or a porous framework method to prepare a multi-component alloy rod.

5 Claims, 1 Drawing Sheet

(51) Int. Cl.
  *B22F 1/145*     (2022.01)
  *B22F 3/15*      (2006.01)
(52) U.S. Cl.
  CPC ..... *B22F 2009/043* (2013.01); *B22F 2201/11* (2013.01)

PREPARATION PROCESS OF MULTI-COMPONENT SPHERICAL ALLOY POWDER

TECHNICAL FIELD

The present invention relates to the technical field of metal powder processing, in particular to a preparation process of multi-component spherical alloy powder.

BACKGROUND

Refractory metals and their compounds, such as tungsten, molybdenum, tantalum, niobium, rhenium, tungsten carbide, tantalum carbide and the like, are widely used in many key fields such as aerospace, national defense and military industry, energy electronics and nuclear industry due to their unique high temperature resistance, corrosion resistance, high density, wear resistance and other special properties. With the development and application of powder metallurgy technology and 3D printing technology, the demand for multi-component spherical powder containing refractory metals or compounds thereof is growing. Spherical powder has the characteristics of good fluidity and high tap density and is good in wettability. After being added as an additive particle, the spherical powder has good bondability with surrounding tissues, and stress concentration is not liable to occur. It is difficult to prepare spherical powder by traditional physical and chemical methods. Powder prepared by the plasma rotation electrode process (PREP) method has a sphericity of up to 95%, is low in content of oxygen and other impurities and excellent in comprehensive performance, and is an ideal material for powder metallurgy and 3D printing. According to the PREP method, a round bar is used as the base material, and the base material is heated and melted by an ultra-high temperature plasma gun, and the molten liquid is centrifugally atomized into spherical powder. For a single refractory metal or compound thereof, it is difficult to smelt and make a rod due to its high melting point and high hardness, which makes it difficult to prepare powder by the PREP method. The present invention solves the problem of difficulty in preparing rods from a single refractory metal or compound thereof by prefabricating a multi-component base material in advance, and can directly prepare the multi-component spherical alloy powder containing the refractory metals or compound thereof by the PREP method.

SUMMARY

Therefore, based on the above background, the present invention provides a preparation process of multi-component spherical alloy powder containing a refractory metal or compound thereof, which adopts the PREP method to prepare the multi-component spherical alloy powder to meet the application requirements.

The present invention is achieved through the following technical solutions:

a preparation process of multi-component spherical alloy powder adopts a PREP method to prepare multi-component spherical alloy powder, the multi-component alloy includes at least one of refractory metals and compounds thereof, specifically including tungsten, molybdenum, tantalum, niobium, rhenium, tungsten carbide, tantalum carbide and the like.

To further describe the present invention, the preparation method thereof is as follows:

2.1 Preparing a multi-component alloy rod; and
2.2 Preparing multi-component spherical alloy powder by the PREP method with the alloy rod of step 2.1.

To further describe the present invention, a spatial structure meshing method is adopted to prepare the multi-component alloy rod in step 2.1, and the preparation method thereof is as follows:

3.1 Designing the size and structure of a mesh according to the size and shape of a refractory metal or compound thereof, preparing wires with multi-component metal components that are convenient to mesh and meshing to form a metal mesh:

in the process of meshing, filling the spatial mesh with the large-sized bulk refractory metal or compound particles thereof by placing the refractory metal or compound particles thereof while meshing;

3.2 After the metal mesh is woven, filling the spatial mesh with small-sized refractory metal or compound particles thereof by vibration;

3.3 Placing the metal mesh filled with the refractory metals or compound thereof in a cylindrical inner cavity mold, and pouring target multi-component alloy into the mold after the rest of components with lower melting points in the target multi-component alloy are molten to be cast into a cylindrical multi-component alloy rod; and 3.4 Treating the surface of the multi-component alloy rod in step 3.3 to make the dimensional accuracy and surface quality thereof meet the requirements of the PREP method.

To further describe the present invention, a direct element mixing method is adopted to prepare the multi-component alloy rod in step 2.1, and the preparation method thereof is as follows:

4.1 Conducting powder batching according to the element ratio of the target multi-component alloy, and then carrying out mechanical ball milling by a ball mill, adopting argon for protection in the ball milling process, and adding stearic acid as a process control agent;

4.2 Under the protection of argon, putting the ball-milled powder material into a graphite mold, manually compacting the upper and lower ends with graphite pads when the powder material is put into the graphite mold, then putting the graphite mold together with the powder into a furnace cavity of a sintering furnace, and closing a furnace door for hot pressed sintering; and 4.3 Treating the surface of the cylindrical multi-component alloy rod obtained by hot pressed sintering to make the dimensional accuracy and surface quality thereof meet the requirements of the PREP method.

To further describe the present invention, before the powder material is put into the graphite mold in step 4.2, the graphite is treated as follows: the surface of the graphite mold in contact with the powder is sprayed with a boron nitride spray, and after the boron nitride spray is air-dried, the ball-milled powder material is put into the graphite mold under the protection of argon.

To further describe the present invention, hot pressed sintering in step 4.3 includes three stages, which are:

(1) Heating stage: putting the ball-milled powder into the graphite mold, then vacuumizing the furnace cavity, and increasing the temperature evenly to the sintering temperature;

(2) Heat preservation stage: performing heat preservation at a set hot pressing temperature so that the element powder particles can be metallurgically bonded; and (3) Cooling stage: cooling the sample with the furnace after the heat preservation is completed.

To further describe the present invention, a porous framework method is adopted to prepare the multi-component alloy rod in step 2.1, and the preparation method thereof is as follows:

7.1 Mixing refractory metal or its compound power particles with a large particle size used as the raw material with a spherical pore-forming agent and then putting into a mixer for mixing;

7.2 Putting the evenly mixed powder on a hydraulic testing machine for compression molding to obtain a cylindrical rod-shaped green body;

7.3 Removing the pore-forming agent from the cylindrical rod-shaped green body through a water solution method or a heating method;

7.4 Sintering the green body in a vacuum tungsten wire sintering furnace at 1200° C.-1800° C. During the heating process, keeping the heating rate at 10° C./min, the vacuum degree at about 10-3 Pa and the holding time for 3 h, and then cooling the green body with the furnace to obtain a three-dimensional penetrating self-continuous porous framework made of a refractory metal or compound thereof;

7.5 Placing the framework made of the refractory metal or compound thereof in the center of a cylindrical mold, then adding other required elements to a smelting furnace in the form of element or compound to be smelted into a liquid state, and then pouring the liquid metal into the mold to obtain a cylindrical multi-component alloy rod; and 7.6 Treating the surface of the multi-component alloy rod to make the dimensional accuracy and surface quality thereof meet the requirements of the PREP method.

To further describe the present invention, stearic acid or urea is used as the pore-forming agent.

By adopting the above technical solutions, the beneficial effects are as follows:

compared with the prior art, the present invention adopts the PREP method to prepare the multi-component spherical alloy powder containing the refractory metal or compound thereof, and the prepared multi-component spherical alloy powder has high sphericity, good fluidity and high tap density, and is low in content of impurity elements and output of hollow powder and satellite powder; compared with other preparation methods, the prepared alloy powder has better performance and is an ideal material for metal 3D printing; and the present invention further solves the problem of difficulty in preparing the round rod with the refractory metal or compound thereof as a base material used in the PREP method, and the multi-component spherical alloy powder made from the refractory metal and compound thereof with excellent performance can be prepared with the prepared round rod with the refractory metal or compound thereof as the base material by the PREP method.

BRIEF DESCRIPTION OF THE DRAWINGS

In order to explain the embodiments of the present invention or the technical solutions in the prior art, more clearly, the accompanying drawings that necessarily used in the description of the embodiments or the prior art are briefly introduced below. Apparently, the accompanying drawings in the following description are only some embodiments of the present invention. For those of ordinary skill in the art, other drawings can also be obtained according to these accompanying drawings without creative efforts.

Figure 1:
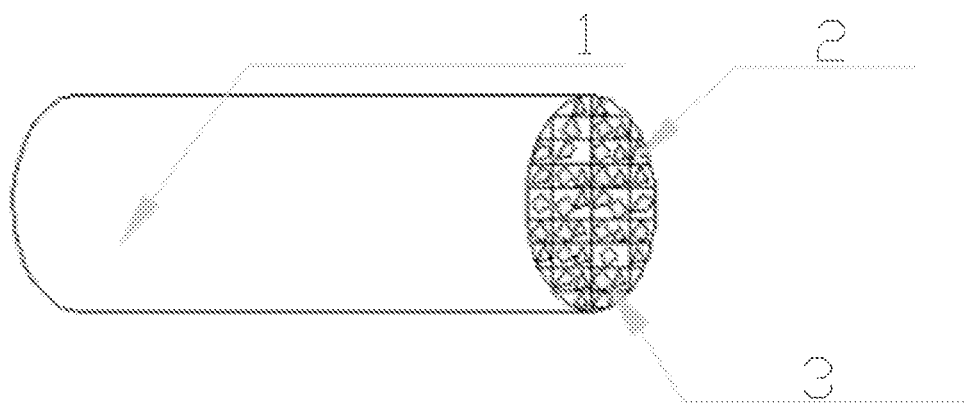
FIG. 1 is a schematic structural diagram of a multi-component alloy rod prepared in Embodiment 1 of the present invention.

Wherein: 1—multi-component alloy rod; 2—mesh; 3—filler metal particles; 4—multi-component alloy rod; 5—framework of a refractory metal or compound thereof; and 6—pouring metal.

DETAILED DESCRIPTION

In order to make the purposes, technical solutions and advantages of the embodiments of the present invention clearer, the technical solutions in the embodiments of the present invention will be clearly and completely described below with reference to the accompanying drawings in the embodiments of the present invention. Apparently, the described embodiments are some embodiments of the present invention, but not all embodiments. Based on the embodiments of the present invention, all other embodiments obtained by those of ordinary skill in the art without creative efforts shall fall within the protection scope of the present invention.

Embodiments of the present invention are described in detail below, and examples of which are illustrated in the accompanying drawings, wherein the same or similar reference numerals refer to the same or similar elements or elements having the same or similar functions throughout. In the description of the present invention, it should be understood that the orientation or positional relationship indicated by the terms such as "upper", "lower", "front", "rear", "left", "right", "inner", "outer", "vertical" and "circumferential" is based on the orientation or positional relationship shown in the accompanying drawings, and is only for the convenience of describing the present invention and simplifying the description, rather than indicating or implying that the indicated device or element must have a specific orientation or constructed and operated in a specific orientation, and therefore should not be construed as limiting the invention.

In the description of the present invention, "first feature" and "second feature" may include one or more of the features. In addition, the terms "first" and "second" are only used for descriptive purposes, and should not be construed as indicating or implying relative importance or implying the number of indicated technical features. Thus, a feature defined as "first" or "second" may expressly or implicitly include one or more of that features.

Figure 2:
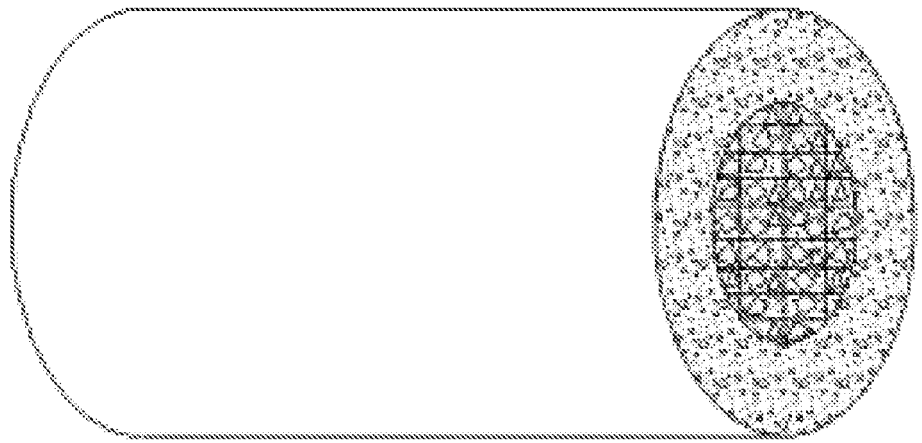
FIG. 2 is a schematic structural diagram of a multi-component alloy rod prepared in Embodiment 3 of the present invention.

The present invention will be further described below with reference to FIG. 1 to FIG. 2.

Embodiment 1: a preparation process of multi-component spherical alloy powder adopts the PREP method to prepare multi-component spherical alloy powder, the multi-component alloy includes at least one of refractory metals and compounds thereof, specifically including tungsten, molybdenum, tantalum, niobium, rhenium, tungsten carbide, tantalum carbide and the like.

The specific preparation method is as follows:
2.1 Preparing a multi-component alloy rod; and
2.2 Preparing multi-component spherical alloy powder by the PREP method with the alloy rod of step 2.1.

In the present embodiment, a spatial structure meshing method is adopted to prepare the multi-component alloy rod, and the specific preparation method thereof is as follows:

3.1 Designing the size and structure of a mesh according to the size and shape of a refractory metal or compound thereof, preparing wires with multi-component metal components that are convenient to mesh and meshing to form a metal mesh:

in the process of meshing, filling the spatial mesh with the large-sized bulk refractory metal or compound particles thereof by placing the refractory metal or compound particles thereof while meshing;

3.2 After the metal mesh is woven, filling the spatial mesh with small-sized refractory metal or compound particles thereof by vibration;

3.3 Placing the metal mesh filled with the refractory metal or compound thereof in a cylindrical inner cavity mold, and pouring target multi-component alloy into the mold after the rest of components with lower melting points in the target multi-component alloy are molten to be cast into a cylindrical multi-component alloy rod; and 3.4 Treating the surface of the multi-component alloy rod in step 3.3 to make the dimensional accuracy and surface quality thereof meet the requirements of the PREP method. The schematic diagram of the result of the multi-component alloy rod prepared in this example is shown in FIG. 1. It can be seen that in the multi-component alloy rod prepared in this example, the metal mesh is filled with the metal filler in the metal mesh.

Embodiment 2: a preparation process of multi-component spherical alloy powder adopts the PREP method to prepare multi-component spherical alloy, multi-components include at least one of refractory metals and compounds thereof, specifically including tungsten, molybdenum, tantalum, niobium, rhenium, tungsten carbide, tantalum carbide and the like. The specific preparation method is as follows:

2.1 Preparing a multi-component alloy rod; and 2.2 Preparing multi-component spherical alloy powder by the PREP method with the alloy rod of step 2.1.

In the present embodiment, a direct element mixing method is adopted to prepare the multi-component alloy rod, and the specific preparation method is as follows:

4.1 Conducting powder batching according to the element ratio of the target multi-component alloy, and then carrying out mechanical ball milling in a planetary high-energy ball mill, in the ball milling process, adopting argon to prevent the powder from being oxidized during the ball milling process, and adding stearic acid as a process control agent to prevent the powder from sticking to the ball and sticking to the tank and to improve the powder collection rate;

4.2 Under the protection of argon, putting the ball-milled powder material into a graphite mold, manually compacting the upper and lower ends with graphite pads when the powder material is put into the graphite mold, then putting the graphite mold together with the powder into a furnace cavity of a sintering furnace, and closing a furnace door for hot pressed sintering; and before sintering, applying a certain prestress to the powder to prevent the powder from being drawn out of the mold during vacuuming.

In this step, before the powder material is put into the graphite mold, the graphite is treated as follows: the surface of the graphite mold in contact with the powder is sprayed with a boron nitride spray, on the one hand, the powder is prevented from diffusing and reacting with the graphite mold during the sintering process, and on the other hand, it is beneficial to demolding a sintered block after sintering; and after the boron nitride spray is air-dried, the ball-milled powder material is put into the graphite mold under the protection of argon.

4.3 Treating the surface of the cylindrical multi-component alloy rod obtained by hot pressed sintering to make the dimensional accuracy and surface quality thereof meet the requirements of the PREP method.

In this step, hot pressed sintering includes three stages, which are:

(1) Heating stage: putting the ball-milled powder into the graphite mold, then vacuumizing the furnace cavity, and increasing the temperature evenly to the sintering temperature;

(2) Heat preservation stage: performing heat preservation at a set hot pressing temperature so that the element powder particles can be metallurgically bonded; and (3) Cooling stage: cooling the sample with the furnace after the heat preservation is completed.

Embodiment 3: a preparation process of multi-component spherical alloy powder adopts the PREP method to prepare a multi-component spherical alloy, multi-components include at least one of refractory metals and compounds thereof, specifically including tungsten, molybdenum, tantalum, niobium, rhenium, tungsten carbide, tantalum carbide and the like. The specific preparation method is as follows:

2.1 Preparing a multi-component alloy rod; and 2.2 Preparing multi-component spherical alloy powder by the PREP method with the alloy rod of step 2.1.

In the present embodiment, a porous framework method is adopted to prepare the multi-component alloy rod, and the specific preparation method is as follows:

7.1 Mixing a refractory metal or hard alloy with a large particle size used as the raw material with a spherical pore-forming agent and then putting into a mixer for mixing; wherein stearic acid or urea is used as the pore-forming agent.

In this step, the spherical pore-forming agent is used to ensure the isotropy of pores, and in order to avoid the segregation of the pore-forming agent, the raw material and the pore-forming agent are put into the mixer for mixing.

7.2 Putting the evenly mixed powder on a hydraulic testing machine for compression molding to obtain a cylindrical rod-shaped green body;

In this step, in order to reduce the friction between the mold wall and the powder, so as to maintain the integrity of the green body during the demolding process after pressing, a zinc stearate alcohol solution is applied to the mold wall as a lubricant before pressing.

7.3 When the pore-forming agent is urea, removing the pore-forming agent from the cylindrical rod-shaped green body through a water solution method. In order to prevent the sample from floating and colliding in the water during dissolution and the collapse of the green body caused by the force when the green body is taken out after dissolution, placing the green body in a wire mesh and then placing the wire mesh in circulating hot water at 60° C. for dissolution. After dissolving for 6 hours, getting the green body out together with the wire mesh and putting the green body into a vacuum drying oven to bake at 230° C. for 3 hours to remove the moisture and residual urea in the green body; and when the pore-forming agent is stearic acid, removing the pore-forming agent of the cylindrical rod-shaped green body by a heating method. In order to avoid the collapse of the green body caused by excessive volatilization of the pore-forming agent, raising the temperature in steps during sintering.

7.4 Sintering the green body in a vacuum tungsten wire sintering furnace at 1200° C.-1800° C. During the heating process, keeping the heating rate at 10° C./min, the vacuum degree at about 10-3 Pa and the holding time for 3 h, and then cooling the green body with the furnace to obtain a three-dimensional penetrating self-continuous porous framework made of a refractory metal or compound thereof;

7.5 Placing the framework made of the refractory metal or compound thereof in the center of a cylindrical mold, then adding other required elements to a smelting furnace in the form of element or compound to be smelted into a liquid state, and then pouring the liquid metal into the mold to obtain a cylindrical multi-component alloy rod;

in this step, since the framework of the refractory metal or compound thereof has high porosity and the pores are interconnected, the pores in the framework can be filled with the molten metal smoothly. Meanwhile, since the size of the framework of the refractory metal or compound thereof is smaller than that of the mold, a "sandwich rod-like" structure is formed after casting, as shown in FIG. 2.

7.6 Treating the surface of the multi-component alloy rod to make the dimensional accuracy and surface quality thereof meet the requirements of the PREP method.

The present invention and the embodiments have been described above, and the description is not restrictive. What is shown in the accompanying drawings is only one of the embodiments of the present invention, and the actual structure is not limited thereto. In a word, if those of ordinary skill in the art are inspired by it and design structure modes and embodiments similar to the technical solution without creativity and departing from the purpose of the present invention, the structure modes and embodiments should fall within the protection scope of the present invention.

The invention claimed is:

1. A preparation process of multi-component spherical alloy powder, characterized by adopting a plasma rotation electrode process (PREP) method to prepare multi-component spherical alloy powder, and the multi-component alloy includes at least one of refractory metals and compounds thereof, specifically including tungsten, molybdenum, tantalum, niobium, rhenium, tungsten carbide, and tantalum carbide;
   wherein the preparation method thereof is as follows:
   2.1 preparing a multi-component alloy rod; and
   2.2 preparing multi-component spherical alloy powder by the PREP method with the alloy rod of step 2.1;
   wherein a direct element mixing method is adopted to prepare the multi-component alloy rod in step 2.1, and the preparation method thereof is as follows:
   4.1 conducting powder batching according to the element ratio of the target multi-component alloy, and then carrying out mechanical ball milling by a ball mill, adopting argon for protection in the ball milling process, and adding stearic acid as a process control agent;
   4.2 under the protection of argon, putting the ball-milled powder material into a graphite mold, manually compacting the upper and lower ends with graphite pads when the powder material is put into the graphite mold, then putting the graphite mold together with the powder into a furnace cavity of a sintering furnace, and closing a furnace door for hot pressed sintering; and
   4.3 treating the surface of the cylindrical multi-component alloy rod obtained by hot pressed sintering to make the dimensional accuracy and surface quality thereof meet the requirements of the PREP method.

2. The preparation process of the multi-component spherical alloy powder according to claim 1, characterized in that before the powder material is put into the graphite mold in step 4.2, the graphite is treated as follows: the surface of the graphite mold in contact with the powder is sprayed with a boron nitride spray, and after the boron nitride spray is air-dried, the ball-milled powder material is put into the graphite mold under the protection of argon.

3. The preparation process of the multi-component spherical alloy powder according to claim 1, characterized in that hot pressed sintering in step 4.3 includes three stages, which are:
   (1) heating stage: putting the ball-milled powder into the graphite mold, then vacuumizing the furnace cavity, and increasing the temperature evenly to the sintering temperature;
   (2) heat preservation stage: performing heat preservation at a set hot pressing temperature so that the element powder particles can be metallurgically bonded; and
   (3) cooling stage: cooling the sample with the furnace after the heat preservation is completed.

4. A preparation process of multi-component spherical alloy powder, characterized by adopting a PREP method to prepare multi-component spherical alloy powder, and the multi-component alloy includes at least one of refractory metals and compounds thereof, specifically including tungsten, molybdenum, tantalum, niobium, rhenium, tungsten carbide, tantalum carbide;
   wherein the preparation method thereof is as follows:
   2.1 preparing a multi-component alloy rod; and
   2.2 preparing multi-component spherical alloy powder by the PREP method with the alloy rod of step 2.1;
   wherein a porous framework method is adopted to prepare the multi-component alloy rod in step 2.1, and the preparation method thereof is as follows:
   7.1 mixing refractory metal or its compound power particles with a large particle size used as the raw material with a spherical pore-forming agent and then putting into a mixer for mixing;
   7.2 putting the evenly mixed powder on a hydraulic testing machine for compression molding to obtain a cylindrical rod-shaped green body;
   7.3 removing the pore-forming agent from the cylindrical rod-shaped green body through a water solution method or a heating method;
   7.4 sintering the green body in a vacuum tungsten wire sintering furnace at 1200 C-1800 C; during the heating process, keeping the heating rate at 10 C/min, the vacuum degree at about 10-3 Pa and the holding time for 3 h, and then cooling the green body with the furnace to obtain a three-dimensional penetrating self-continuous porous framework made of a refractory metal or compound thereof;
   7.5 placing the framework made of the refractory metal or compound thereof in the center of a cylindrical mold, then adding other required elements to a smelting furnace in the form of element or compound to be smelted into a liquid state, and then pouring the liquid metal into the mold to obtain a cylindrical multi-component alloy rod; and
   7.6 treating the surface of the multi-component alloy rod to make the dimensional accuracy and surface quality thereof meet the requirements of the PREP method.

5. The preparation process of the multi-component spherical alloy powder according to claim 4, characterized in that stearic acid or urea is used as the pore-forming agent.

\* \* \* \* \*